(12) United States Patent
Venkataraman et al.

(10) Patent No.: US 8,189,474 B2
(45) Date of Patent: May 29, 2012

(54) DYNAMIC STACK-BASED NETWORKS FOR RESOURCE CONSTRAINED DEVICES

(75) Inventors: Mukundan Venkataraman, West Bengal (IN); Kartik Muralidharan, Bangalore (IN); Puneet Gupta, Bangalore (IN)

(73) Assignee: Infosys Limited, Bangalore (IN)

( * ) Notice: Subject to any disclaimer, the term of this patent is extended or adjusted under 35 U.S.C. 154(b) by 553 days.

(21) Appl. No.: 11/906,141

(22) Filed: Sep. 27, 2007

(65) Prior Publication Data

US 2008/0212504 A1 Sep. 4, 2008

(30) Foreign Application Priority Data

Sep. 28, 2006 (IN) .............. 1793/CHE/2006

(51) Int. Cl.
- *H04L 12/26* (2006.01)
- *H04L 12/28* (2006.01)
- *H04W 72/00* (2009.01)
- *G06F 15/16* (2006.01)
- *H04J 3/16* (2006.01)

(52) U.S. Cl. ..... 370/235; 370/252; 370/469; 455/452.2; 709/230

(58) Field of Classification Search .......... None
See application file for complete search history.

(56) References Cited

U.S. PATENT DOCUMENTS

| | | | |
|---|---|---|---|
| 6,822,940 B1 * | 11/2004 | Zavalkovsky et al. | 370/237 |
| 6,831,913 B1 * | 12/2004 | Vialen | 370/349 |
| 6,981,052 B1 * | 12/2005 | Cheriton | 709/232 |
| 6,987,730 B2 * | 1/2006 | Hata et al. | 370/232 |
| 6,990,107 B1 * | 1/2006 | Rinne et al. | 370/395.6 |
| 7,058,055 B2 * | 6/2006 | Mugica et al. | 370/392 |
| 7,092,358 B2 * | 8/2006 | Ruutu et al. | 370/230 |
| 7,106,737 B1 * | 9/2006 | Beyda et al. | 370/392 |
| 7,177,293 B2 * | 2/2007 | Mansfield | 370/335 |
| 7,272,156 B2 * | 9/2007 | Shoemake et al. | 370/469 |
| 7,289,453 B2 * | 10/2007 | Riedel et al. | 370/252 |
| 7,505,444 B2 * | 3/2009 | Rinne et al. | 370/338 |
| 7,602,792 B2 * | 10/2009 | Gray et al. | 370/395.5 |
| 7,630,736 B2 * | 12/2009 | Wang | 455/553.1 |
| 7,873,048 B1 * | 1/2011 | Kondapalli | 370/392 |
| 7,924,728 B2 * | 4/2011 | Riga et al. | 370/238 |
| 8,036,112 B2 * | 10/2011 | Labrador et al. | 370/230 |
| 2003/0023746 A1 * | 1/2003 | Loguinov | 709/235 |
| 2003/0236904 A1 * | 12/2003 | Walpole et al. | 709/231 |
| 2005/0149628 A1 * | 7/2005 | Mazzola | 709/224 |
| 2005/0213576 A1 * | 9/2005 | Stephens | 370/390 |
| 2006/0203730 A1 * | 9/2006 | Zur | 370/235 |
| 2006/0205443 A1 * | 9/2006 | Simoens et al. | 455/574 |
| 2007/0160003 A1 * | 7/2007 | Meier | 370/329 |
| 2008/0082683 A1 * | 4/2008 | DelloStritto et al. | 709/236 |

(Continued)

OTHER PUBLICATIONS

Provisional U.S. Appl. No. 60/787,147, filed Mar. 28, 2006, DelloStritto et al.*

(Continued)

*Primary Examiner* — Gregory Sefcheck

(74) *Attorney, Agent, or Firm* — Klarquist Sparkman, LLP

(57) ABSTRACT

A wireless sensor network provides a communication link between a plurality of nodes. Communication among the plurality of nodes is based one or more protocol components that are associated with a selected quality of service (QoS). A preamble byte can have bit values assigned based on application preferences, and the preamble byte used to select one or more protocol components from a component library. The preamble byte is combined with a data payload and transmitted to additional nodes based on the selected QoS.

20 Claims, 6 Drawing Sheets

U.S. PATENT DOCUMENTS

2009/0040955 A1* 2/2009 Jung et al. .................. 370/311

OTHER PUBLICATIONS

Chen et al., "Span: An Energy-Efficient Coordination Algorithm for Topology Maintenance in Ad Hoc Wireless Networks," *Wireless Networks* 8:481-494 (2002).

Felemban et al., "MMSPEED: Multipath Multi-SPEED Protocol for QoS Guarantee of Reliability and Timeliness in Wireless Sensor Networks," *IEEE Transactions on Mobile Computing*, 5:738-754 (Jun. 2006).

He et al., "SPEED: A Stateless Protocol for Real-Time Communication in Sensor Networks," *International Conference on Distributed Computing Systems* (2003).

Venkataraman et al., "Designing New Architectures and Protocols for Wireless Sensor Networks: A Perspective," *Proceedings of the Second Annual IEEE Communications Society Conference on Sensor and Ad Hoc Communications and Networks* (*IEEE SECON*), Santa Clara, CA (Sep. 27, 2005).

Venkataraman et al., "Stack Aware Architectures for Mobile Ad Hoc Networks," Internet Draft, 14 pp. (May 19, 2004).

\* cited by examiner

FIG. 1A
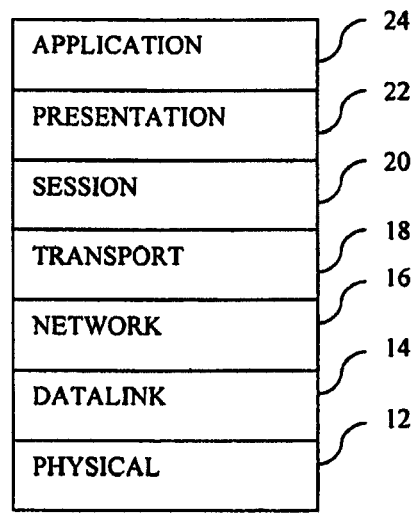
PRIOR ART
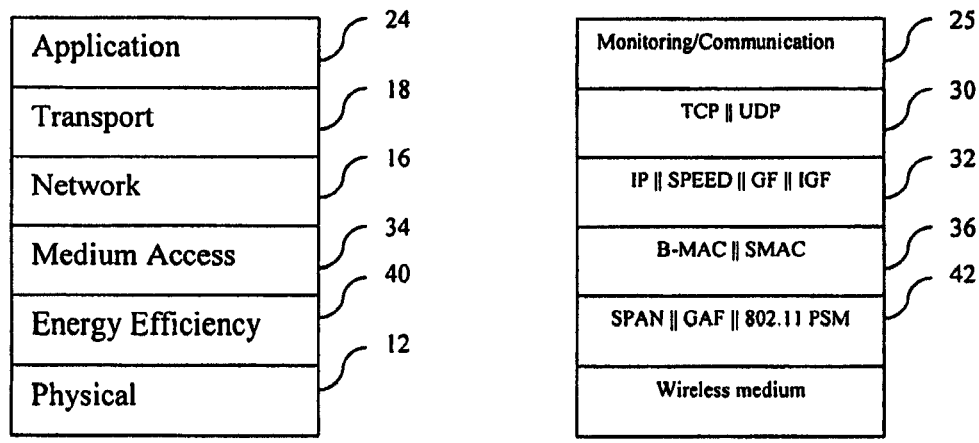
FIG. 1B

DYNAMIC STACK-BASED NETWORKS FOR RESOURCE CONSTRAINED DEVICES

CROSS-REFERENCE TO RELATED APPLICATIONS

The present application claims priority to Indian Application No. 1793/CHE/2006, filed Sep. 28, 2006 that is incorporated herein by reference.

TECHNICAL FIELD

The disclosure pertains to dynamic stack configurations for networks that include resource constrained devices.

BACKGROUND AND SUMMARY

Wireless sensor networks are commonly used in environmental sensing and consist of nodes with embedded sensing and communication devices. Node hardware can be provided with small devices with sizes comparable to a quarter. Such networks can form the basis for "smart" environments in hospitals, conference rooms, homes, or on battlefields. Primary operations in wireless sensor networks (WSNs) can be environmental sensing and reporting to a base station, or relaying information to and from other nodes. Mobile Ad hoc Networks (MANETs) are infrastructure-less in nature, and require no pre-deployed communication set-up and such configurations can be used with WSNs. MANETs are self collaborative, and can automatically discover routes to a destination using intermediate nodes to route data to a destination not directly reachable using multiple short hops rather than a single hop from source to destination. This "short-hop" communication is a natural choice for WSNs since multiple short hops typically conserve energy for the source node and dissipate small amounts evenly at intermediate nodes. A pervasive computing set-up includes many individual components, and ad hoc networks are well suited for the necessary networking support. However, MANETs are challenged by the inherent dynamism of the network, demands on communication bandwidth and interference, and energy usage and network lifetime.

The basic network communication process consists of sending data from source to destination. An application at a source generates information that is encoded and transmitted to a destination where it is decoded by a destination application. This communication process can be logically partitioned into a definite sequence of events or actions, and individual entities then form "layers" of a communication "stack." Traditionally, the communication process has been formally organized as the ISO-OSI reference model stack that includes seven layers from the Application Layer to the Physical Layer.

Application-specific communication protocols can be adapted to new uses such as in WSNs. For example, the use of the Internet architecture and its component protocols has grown rapidly, and Internet-based designs and protocols have been migrated to other applications such as WSNs. While Internet protocols are well suited to Internet use, Internet-based operation can be unsatisfactory with WSNs which have substantially different requirements. In addition, the individual modules designed for WSNs are often validated over a set of workloads that are thought to be representative of the entire application gamut of WSNs. This is not generally a valid assumption, since the application types and their requirements are extremely variable. Applications requirements range from point-to-point (P2P) to broadcast to anycast communications. Some applications demand reliable communication while others do not, and some have real-time time constraints (such as low latency) while others do not. Hence, it is inappropriate to assume that a given module performing over a particular workload or tuned to do well for one application can be successfully applied everywhere. Because of these variable requirements, it is challenging to come up with a single module that handles all application types.

Accordingly, methods and apparatus are needed that can identify features needed in a suitable stack so that these features can be included in stack designs rather than merely accepting features obtained by protocol migration from the Internet or other networks (such stack designs are referred to hereinafter as "stack aware architectures"). In addition, Internet-based designs should be validated for "stack aware" properties. Furthermore, a taxonomy of application types needs to be established for WSNs that lists functions that each application type demands. A dynamic stack that maps requirements for an application to available modules on a per packet basis based on preamble processing of the stack is needed as well. According to representative embodiments, a communication system in a wireless sensor network adapted to provide a communication link between a plurality of nodes includes a protocol stack encapsulating a plurality of fundamental network protocol layers that correspond to an open system interconnection (OSI) model, wherein each of the layers comprises a plurality of modules. The communication system further includes a preamble module adapted for defining a set of requirements for at least one application. In some examples, the communication system includes a communication module adapted for communicating data between the plurality of nodes by selecting one or more modules from at least one of the layers of the stack to form a combination of modules indicative of the preamble module defined, wherein the combination is based on quality of service (QoS) desired by the at least one application.

According to additional examples, methods for wireless sensor networks adapted to provide a communication link between a plurality of nodes comprise a protocol stack encapsulating a plurality of fundamental network protocol layers that correspond to an open system interconnection (OSI) model, wherein each of the layers comprises a plurality of modules. The methods include defining a set of requirements for at least one application using a preamble module. The methods further include communicating data between the plurality of nodes by selecting one or more modules from at least one of the layers of the stack to form a combination of modules indicative of the preamble module, wherein the combination is based on quality of service (QoS) selected for the at least one application. The selection of the one or more modules for the at least one layer can be based on the selected modules in preceding layers and available modules in succeeding layers.

Wireless sensor network nodes comprise a preamble module adapted for defining a set of requirements for communication of a data packet by an application and a protocol lookup module configured to identify at least one component protocol based on the defined set of requirements. A protocol assembler is configured to assemble a protocol stack based on selected protocol components and process the data packet based on the component protocol and deliver the processed data packet to a scheduler. In some examples, the preamble module is configured to define the set of requirements by establishing a preamble that is communicated with the data packet. In other examples, the preamble is defined as a byte that includes bits associated with data type, data transfer reliability, and data transfer delay, respectively. In further embodiments, the protocol lookup table is configured to store protocol characteristics in association with bits of the preamble byte. In further examples, the preamble module is configured to assign at least one of an acknowledgement flag, a link estimate flag, a data type flag, a retransmission flag, an application type, a real-time flag, or a load balance flag to a preamble byte. In other embodiments, the protocol lookup includes a memory configured to store application requirements for a plurality of applications.

Wireless network nodes comprise a processor configured to receive an indication of a quality of service (QoS) requested by an application and determine values of at least one bit of a preamble byte based on the QoS, and a transmitter configured to transmit a data packet established by the application and the preamble byte. In other examples, the processor is configured to receive an estimate of network congestion at least one network node, and the value of at least one bit of the preamble byte is based on the estimate. In still further embodiments, the processor is configured to receive an indication of available protocol components exclusive of the selected component, and at least a second preamble bit value is determined based on the indication.

Methods comprise associating at least one network preference with a data payload to be transmitted, and attaching at least one preamble bit to the data payload, wherein a value of the at least one preamble bit is based on the network preference. The at least one preamble bit and the data payload are then transmitted. In additional examples, at least one protocol component is selected based on the at least one preamble bit. In other embodiments, the data payload and the at least one preamble bit are transmitted to the network node based on the selected protocol component. In further examples, the preamble is a byte that includes preamble bits associated with data type, data reliability, and data delivery delay, and the preamble byte is attached to the data payload. In still further examples, the preamble bit and the data payload are transmitted by a network application and a plurality of protocol components are selected based on the preamble byte. In some examples, the protocol component is selected based on a protocol component look-up table. In other examples, the selected protocol component is selected based on a preferred energy use at least one network node or based on congestion at least one network node. In one example, the selected protocol component is UDP.

In additional examples, the at least one network preference is associated with a subsequent data payload that is substantially similar to the transmitted data payload, and the at least one preamble bit is attached to the subsequent data payload. At least one subsequent protocol component is selected that is different than the protocol component associated with transmission of the transmitted data payload. In further examples, the subsequent data payload is transmitted based on the subsequent protocol component. In other examples, at least one bit of the preamble byte is assigned by an application associated with the data payload. In further examples, at least a second protocol component is selected based on the selected protocol component and the preamble byte.

In some examples, a tangible computer program product includes computer-executable instructions for providing a communication link between a plurality of nodes. A protocol stack encapsulating a plurality of network protocol layers comprising a plurality of modules is selected based on requirements requested by an application. In particular examples, the requirements are associated with a requested quality of service (QoS), and least one of the plurality of modules is selected based on a previously selected module or a set of modules available to be selected for a different protocol layer. In some examples, a selected module is replaced in the protocol stack in response to a change in the QoS requested by the application or in response to network congestion or power consumption. In other examples, the at least one application is characterized to produce an associated preamble. In other examples, a selected protocol component is replaced by a different protocol component in response to a request for data transmission by the application. In some examples, the application QoS or other application requirements are provided based on user input or an application type. In some examples, a preamble is assigned based one or more categories associated with real-time data transmission requests.

These and other features, aspects, and advantages of the technology are described in detail below with reference to the accompanying drawings.

BRIEF DESCRIPTION OF THE DRAWINGS

FIG. 1A is a schematic representation of Internet architecture of the ISO/OSI Network Model in one embodiment of the present technique.

FIG. 1B is a tabular column depicting the possible layers of a stack for wireless sensor networks in one embodiment of the present technique.

DETAILED DESCRIPTION

Figure 2:
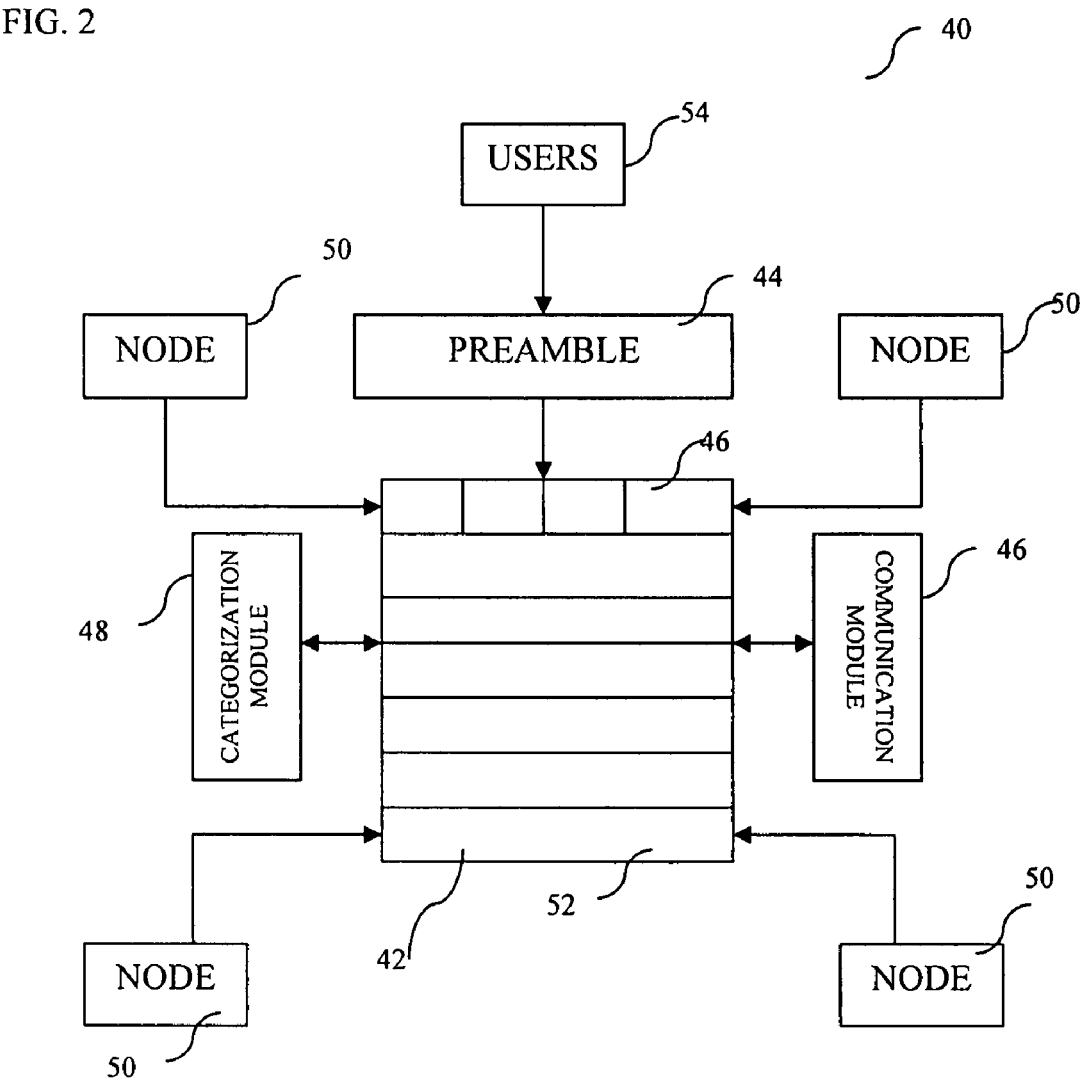
FIG. 2 is a block diagram of a communication system in a wireless sensor network adapted to provide a communication link between a plurality of nodes in one embodiment of the present technique.

The following description is a full and informative description that includes descriptions of the best methods and systems presently contemplated for implementing the present technology. Of course, many modifications and adaptations will be apparent to those skilled in the art in view of the following description. Further, some of the features of the present techniques may be used to advantage without the corresponding use of other features described in the following paragraphs. As such, the present description should be considered as merely illustrative and not limiting.

As a preliminary matter, the definition of the term "or" for the purpose of the following discussion and the appended claims is intended to be an inclusive "or." That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA."

As used in this application and in the claims, the singular forms "a," "an," and "the" include the plural forms unless the context clearly dictates otherwise. Additionally, the term "includes" means "comprises." The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

The present invention generally relates to resource constrained devices, and more particularly to dynamic and adaptive stacks for wireless sensor networks. The disclosed methods and apparatus can be more conveniently described with reference to typical use environments. As discussed above, a basic communication process has been formally organized as the ISO-OSI (International Standard Organization—Open System Interconnection) reference model stack. This stack consists of seven layers, namely, Application, Presentation, Session, Transport, Network, Ethernet and Physical. Each of the layers will be described in greater detail in the subsequent sections to follow. Some stack elements are described in the following section.

A Transmission Control Protocol (TCP) is a transport layer protocol used by an application in one host to communicate with an application in another host. This is accomplished by services provided by the protocol layers beneath the transport layer in both hosts. As a connection-oriented protocol, TCP requires the establishment of a connection between the two hosts before two applications are able to communicate. TCP manages the connection and once both applications have communicated all required information between themselves, the connection is released as if the connection is two simplex connections as opposed to a single duplex connection. The information may be transferred between applications on different hosts as a byte stream. The transport layer hides message transfer details such as segmentation, ordering and duplication from the applications and provides end-to-end acknowledgement.

The Internet Protocol (IP) layer provides certain services to the transport layer protocol including hiding the details of the physical and data link layers and the services provided by them from the transport layer protocol. The IP layer provides a datagram delivery service. A datagram is a unit of data less than an entire message. A message may be, for example, a file, which may be quite large. Since there is typically a maximum size for a message (or file) to be communicated, the message may have to be segmented and transferred in smaller units. These smaller units are called datagrams. Each datagram is sent over the network as a separate entity and may, in fact, follow separate paths to the destination host. At the destination host, the datagrams are reassembled in proper order (usually in a buffer area) by the transport layer. Each node on the network sends any datagrams on to a next node only considering the final destination and only acknowledges receipt of the datagram to the preceding node. That is, the IP layer does not provide end-to-end acknowledgement. End-to-end acknowledgement is a service of the transport layer protocol. Should any node-to-node acknowledgements not be received by the preceding node, the datagram or datagrams unacknowledged will be retransmitted. The transport layer in the destination host will also acknowledge any duplicated datagrams (else receipt of duplicate datagrams will continue resulting in a clogged network) and ignore them. Routing between network nodes is accomplished by means of routing tables. These routing tables can be static or dynamic and result in datagrams being forwarded from a source host to a destination host one node at a time. The intermediate nodes are often called "hops."

So-called TCP/IP communications are based on a five layer protocol model similar to the ISO/OSI seven layer protocol model. The TCP/IP model does not have the equivalent to layers five and six of the ISO/OSI protocol model. Other protocol models can be used as well. A protocol model generally defines the protocol layers and the interfaces between the layers. When implemented in software, hardware or firmware or field programmable gate arrays (FPGAs), the implementation provides the actual services. This layered approach allows for ease of upgrading so long as the interface to the layer immediately above or below is not altered. Layering also allows for complete substitution. For example, should a new physical medium become available then so long as the interface between layer two and layer one remain the same, an old physical layer implementation module can be removed and a new implementation module substituted. In the alternative, the new implementation module could be added as another option. That is, the protocol suite defines the rules and the implementation provides the services that allow the communications to take place between applications on different hosts. The implementation of the TCP layer provides for the application to require a certain Quality of Service (QoS) as specified by a set of parameters including but not limited to priority, transmission delay, throughput etc.

Another well-known transport layer protocol is known as a User Datagram Protocol (UDP), which is a connectionless transport protocol. The basic data transfer unit is the datagram. A datagram is divided into header and data areas as it is for the IP layer. An additional header over and above the IP header is used. The UDP header contains source and destination addresses (ports), a UDP length field (the length includes the 8 byte header and the data) and a UDP checksum. The UDP data includes the IP header and data. The IP layer supports UDP as a connectionless transport protocol for use in transmitting, for example, one time request-reply type messages or applications where time is of greater importance than accuracy.

TCP is used by applications on different hosts to communicate over an assumed unreliable network. To accomplish such communication much is added to the protocol in order to ensure that the information transferred over the network is valid. This addition has a cost and that cost is increased overhead with the attendant increase in demand on transmission capacity. A UDP header is eight bytes, the TCP header is 24 bytes and an IP header is a minimum of 20 bytes. Therefore, UDP/IP headers are a minimum of 28 bytes and TCP/IP headers are a minimum of 44 bytes. This is fairly large in terms of overhead and bandwidth utilization particularly over wireless networks. There are other significant problems with using standard TCP/IP over wireless networks principally in the area of flow control. The UDP/IP protocol combination, while not offering any guarantees to users, is expected to be reliable. Wireless networks tend, however, by their nature to be lossy.

Quality of Service can be viewed from the standpoint of an application. An application may be defined as a program at a host or network node that uses services offered by another remote application or passes a message or information to another remote application. This application, which will make use of a communication stack, will have certain requirements from the stack that define the methods and parameters for exchanging information with another remote application, generally based on reliability and real-time time constraints. Other metrics evaluated for determining how the stack is configured to fragment and send datagrams (including estimates of link reliability and load balancing) from an application include the type of data (normal data, critical control information, streaming bytes, etc.) and application type (broadcast, anycast, multicast or point-to-point). Efficient use of available resources is desirable.

FIG. 1A is a schematic representation of Internet architecture 10 of the ISO/OSI Network Model in one embodiment of the disclosed technique. The standard model for networking protocols and distributed applications is the International Standard Organization's Open System Interconnect (ISO/OSI) model. Each of the seven layers of the modified architecture are explained in greater detail below. A Physical Layer 12 defined a physical medium such as thinnet, thicknet, unshielded twisted pairs (UTP), or wireless. While different media can be functionally equivalent, convenience and cost of installation and maintenance and operation reliability can vary. The Physical Layer 12 is configured to adapt to various media.

A Data Link layer 14 defines a format of data on the network. A network data frame (a packet) includes a checksum, source and destination addresses, and data. A largest packet that can be sent through the Data Link Layer is referred to as a Maximum Transmission Unit (MTU). The data link layer handles the physical and logical connections to the packet's destination using a network interface. A host connected to an Ethernet would have an Ethernet interface to handle connections to the outside world, and a loopback interface to send packets to itself.

Ethernet addresses a host using a unique 48-bit address called its Ethernet address or Media Access Control (MAC) address. MAC addresses are usually represented as six colon-separated pairs of hex digits, e.g., 8:0:20:11:ac:85. This number is unique and is associated with a particular Ethernet device. Hosts with multiple network interfaces should use the same MAC address on each. The data link layer's protocol-specific header specifies the MAC address of the packet's source and destination. When a packet is sent to all hosts (broadcast), a special MAC address is used.

The third layer is a Network Layer 16 that uses Internetwork Protocol (IP) as its network layer interface. IP is responsible for routing, directing datagrams from one network to another. The network layer may have to break datagrams that are larger than an MTU into smaller packets and a host receiving the packet will have to reassemble the fragmented datagram. The Internetwork Protocol identifies each host with a 32-bit IP address. IP addresses are written as four dot-separated decimal numbers between 0 and 255, e.g., 129.79.16.40. The leading 1-3 bytes of the IP address identify the network and the remaining byte identifies the host on that network. For large sites that are usually subnetted, the first two bytes represent the network portion of the IP, and the third and fourth bytes identify the subnet and host respectively. Even though IP packets are addressed using IP addresses, hardware addresses must be used to actually transport data from one host to another. The Address Resolution Protocol (ARP) is used to map the IP address to it hardware address.

The fourth layer is a Transport Layer 18 which was explained above. The transport layer subdivides a user-buffer into network-buffer sized datagrams and enforces desired transmission control. Transport protocols such as a Transmission Control Protocol (TCP) and a User Datagram Protocol (UDP) can sit at the transport layer. Reliability and speed are the primary difference between these two protocols. TCP establishes connections between two hosts on the network through 'sockets' which are determined by the IP address and port number. TCP keeps track of the packet delivery order and the packets that must be resent. Maintaining this information for each connection makes TCP a stateful protocol. UDP on the other hand provides a low overhead transmission service, but with less error checking. NFS is built on top of UDP because of its speed and statelessness.

As illustrated, the stack includes the fifth layer or Session Layer 20 which defines the format of the data sent over the connections. The NFS uses the Remote Procedure Call (RPC) for its session protocol. RPC may be built on either TCP or UDP. Login sessions use TCP whereas NFS and broadcast use UDP.

The sixth layer is a Presentation Layer 22 that is associated with External Data Representation (XDR). At this layer, local representations of data are converted to a canonical form and vice versa. The canonical form uses a standard byte ordering and structure packing convention, independent of the host.

The last layer is an Application Layer 24 which provides network services to end-users. Mail, ftp, telnet, DNS, NIS, NFS are examples of network applications.

As will be appreciated by those of skill in the art, although the OSI model is widely used and often cited as the standard, TCP/IP protocol has been used by most Unix workstation vendors. TCP/IP is designed around a simple four-layer scheme. It does omit some features found under the OSI model, combining the features of some adjacent OSI layers and splitting other layers apart. The four network layers defined by TCP/IP model are as follows.

Layer 1—link layer. This layer defines the network hardware and device drivers.

Layer 2—network layer. This layer is used for basic communication, addressing and routing. TCP/IP uses IP and ICMP protocols at the Network Layer 16.

Layer 3—transport layer. This layer handles communication among programs on a network. TCP and UDP fall within this layer.

Layer 4—application layer. End-user applications reside at this layer. Commonly used applications include NFS, DNS, arp, rlogin, talk, ftp, ntp and traceroute.

FIG. 1A is a tabular column depicting the possible layers of a stack 26 for wireless sensor networks in one representative embodiment. FIG. 1B shows representative layers and corresponding example modules that can be present at such layers. An Application Layer 24 can include a monitoring or communication layer 25 that reports environmental or other sensing results or communicates data or control information between motes/terminals. A Transport Layer 18 can include a TCP/UDP module 30. TCP can provide reliable, in-order delivery with complete congestion and flow control. TCP is generally associated with set-up of a session to between end nodes before communication begins and is a bulky, but can be preferred for high reliability, in-order data delivery. UDP provides unreliable delivery, without congestion or flow control, but is typically simple to implement and provides fast data transfer. UDP is generally superior to TCP for real-time time data communication.

A Network Layer 16 can be based on one or more routing and addressing modules 32 associated with, for example, IP based routing and addressing (ideal for point-to-point connections), location based or geography based routing and addressing such as provide by protocols such as SPEED, Geographic Forwarding (GF), and Implicit Geographic Forwarding (IGF).

A Medium Access Layer 34 has metrics such as high goodput (ratio of sent packets to attempts to send), low energy consumption and light implementations. Possible component modules 36 are B-MAC and S-MAC. B-MAC typically uses less memory and energy. Both protocols, however, are typically preferred to IEEE 802.11 PSM (power saving mode). A representative energy efficiency module 42 can be based on a SPAN protocol which is designed for energy efficiency in ad hoc networks. SPAN typically provides a network lifetime as much as 20 times greater than that otherwise available. IEEE 802.11 based application can be provided for 802.11 enabled campuses.

The stack consists of layers, and layers consist of component modules or protocol components. Modules (or components) are compiled code programs that take a datagram appropriate as an input for that layer and output an encapsulated datagram that is appropriate as an output for that layer. Many modules can be present as an option at any layer. Modules typically export an API which is called at the service access points (the junctions between two layers).

Some application dependent objectives of an adaptive stack include:

Reliability: Some applications (such as habitat monitoring) require reliability. It is preferable to allow link-layer acknowledgement to provision for reliable communication.

Gray Areas: Gray areas have an effect on MAC as well. Link strength estimation can provide superior results.

Adaptable functions: Accommodation can be provided for a diversity of traffic types.

Preamble sampling: When nodes send data (typically broadcast), nodes in the receiving range would have to sample through the preamble to determine the course of their action with it.

Switching States: Switching between sleep to awake is a crucial phase, and care must be taken to reduce the number of control messages needed for reliable operation auto switching between "sleep" and "awake."

Uniform Energy Dissipation: Network lifetime is a primary target for energy conservation techniques. No single node should dissipate too much energy, and when possible, neighboring nodes should cyclically take up the load to ensure a uniform (at least an "almost" uniform) energy dissipation.

Other general considerations include:

Wireless Medium: Embedded devices can be associated with lossy links, high bit error rates, and limited security.

Robust, Reliable Systems: Hardware costs can be disposable and must operate without network intervention.

Security, Confidentiality and Authentication: In WSNs, processing and memory are limited so that complex security measures are burdensome.

Micro stack: Environmental monitoring is a prime application. Nodes in WSNs are constrained for processing and memory, and the internetworking problem is nowhere close to the complexity of the Internet. At a bare minimum, it is sufficient to be able to form connected graphs with strong links with neighboring nodes. Further, nodes receiving packets for forwarding must do this "on-the-fly." The concept of "store-process-forward" is not recommended because: memory and processor capacity are in demand, and some applications are sensitive to this additionally induced latency.

Scalability: The network should be capable of scaling to a large numbers of motes.

To cope with the above network features as well as typical WSN memory, processor, and energy limitations, a dynamic stack is described herein. A series of micro functions are provided in pre-compiled components, and component selection is based on application demands.

The following four guidelines are generally considered in stack aware architectures. 1) Stacks are modular and can be dynamically updated (and replaced). Component selection can be based on other selected components to avoid function overlap and interferences. 2) Protocol components are preferably stateless, and do not operate based on states of nodes outside its transmission range. 3) Beacons can be provided. Beacons can also provide estimates of node congestion. Nodes typically use geography information rather than IP addresses in communications. 4) Energy efficient modules are available. SPAN and GAF 42 are intended for ad hoc networks, and MAC has the popular 802.11 DCF in power saving mode (PSM) SMAC, B-MAC and IGF are targeted specifically to WSNs. SPAN and GAF use many control messages, especially when making transitions from sleep to awake and vice versa. IGF exhibits better performance in these situations. Grid sizes in GAF are static and nodes require geography information. SPAN uses a variety of control messages. IGF uses both geography information but requires fewer control messages. With a metric of conserving bandwidth and energy, IGF would make a better choice. S-MAC implementations are bulkier than B-MAC, and S-MAC is more complex. B-MAC allows nodes to select use of acknowledgements and a simple channel access method. Acknowledgements, if used, should generally be provided at the Link Layer. This allows for link-layer re-transmissions (when necessary) without involving higher layers.

In order to minimize the issues with the conventional stack, a preamble is added to the application payload. The bits in a preamble byte are used to describe application demands.

FIG. 2 is a block diagram of a communication system 40 in a wireless sensor network adapted to provide a communication link between a plurality of nodes in one example embodiment. As illustrated, the system 40 includes a protocol stack 42, a preamble module 44, a communication module 46, a categorization module 48, and multiple nodes 50. The protocol stack 42 encapsulates multiple fundamental network protocol layers 52 that correspond to the open system interconnection (OSI) model or other model, wherein each of the layers can comprise multiple component modules 46. The preamble module 44 may be adapted to define a set of requirements for at least one of the applications. The set of requirements may be specified by at least one user 54 and the preamble module 44 is defined based on a type of the at least one application. For example, when an event such as a potential intrusion is detected in a home security monitoring application, the stack can be re-configured to provide higher bandwidth and to provide reliable transmission from remote nodes, even if node batteries are nearly depleted or in sparsely populated sensor regions. The communication module 46 may be adapted for communicating data between the multiple nodes by selecting one or more modules from at least one of the layers of the protocol stack 42 to form a preferred combination of modules 46 indicative of the preamble defined by the preamble module 44. The selected combination is typically based on a quality of service (QoS) selected for the at least one application, wherein QoS can be associated with data reliability, latency, or other service characteristics.

In one example, the selection of one or more modules 46 from the at least one layer 44 can be updated based on any changes in the requirements of the at least one application. The selection of one or more modules for the at least one layer can also be dynamically updated based on any change in overall system context. Changes in reliability, link estimates, or load balancing can be used to update the stack, and additional or different stack components selected.

The system 40 includes the categorization module 48 adapted to categorize the at least one application into one or more categories for defining the preamble byte. It should be noted that the categories include at least one of the type of application or type of packets such as whether real-time communication is appropriate. In certain implementations the selection of the one or more modules 46 from the at least one layer 52 is based on the selected modules 46 in preceding layers and available modules in succeeding layers.

The preamble module 44 typically provides at least one of an acknowledgement flag, a link estimate flag, a data type flag, a retransmission flag, an application type, a real time flag, or a load balance flag or combinations thereof.

Figure 3:
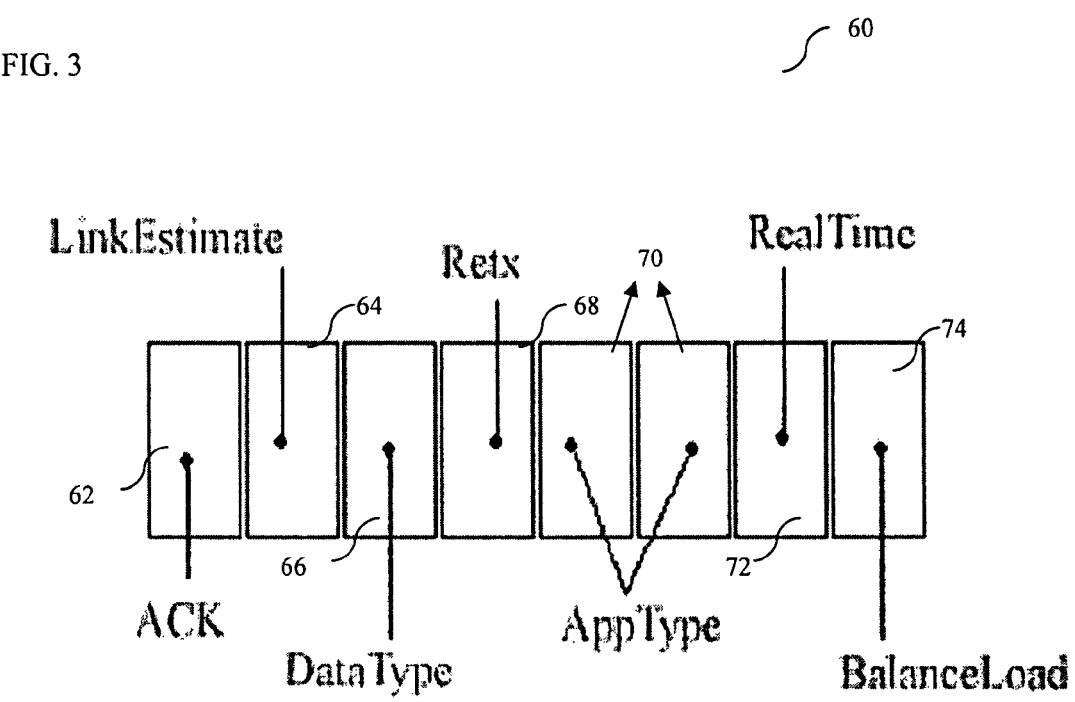
FIG. 3 depicts bits of a byte preamble for wireless sensor networks in one embodiment of the present technique.

FIG. 3 illustrates a representative example of a bit arrangements in a byte preamble 60. The stack is "dynamic" because it is based on preamble processing wherein specific functions are implemented based on protocol components selected from a protocol component pool. Hence, an application requesting reliability gets it, and applications not requesting it do not.

As illustrated, the preamble consists of the following fields:

1) Acknowledgment Flag 62: This flag facilitates use of Link Layer acknowledgements. It should be noted that this does not entail a retransmission. This notifies the upper layer of the ACK packet, depending upon the choice of solicitRetx( ) used. Default value for this is decided with the application type and data packet in question.
2) Link Estimate Flag 64: This would be used by application where loss is not tolerated such as, for example, in transmission of a control packet. Enabling this ensures a strong link as a metric for the next candidate node.
3) Data Type Flag 66: Packets are broadly classified as control information (which takes a higher priority) and data packets. The sensitivity of a data packet is further estimated on the application type.
4) Retransmission Flag 68: This flag indicates a retransmission request upon failure of packet delivery. This requires Ack-Flag to be set.
5) Application Type 70: This is a two bit field that along with data-type flag, can define default parameter values for other fields. Applications types are classified as point-to-point, multicast, broadcast, and anycast.
6) Real Time Flag 72: This bit is also mandatory. Real-time data is sent with higher priority (and at par with control messages) compared to normal data. Real-time data is also subject to load balancing procedures, unlike control messages.
7) Load Balance Flag 74: When this flag is set, a forwarding node takes into consideration load balancing as criteria in the next candidate hop selection. Packets may be routed to a node that is less loaded with a possible tradeoff for a shortest path.

To set one or more of these fields, a set of API's is available to the application program. An exemplary set of APIs for use by applications and the associated macros are described below. Notation similar to that of TinyOS implementations is used.

| Macro Usage |
| --- |
| //Packet Type |
| #define BEACON 1 |
| #define ACK 2 |
| #define CONTROL 3 |
| #define DATA 4 |
| //Application |
| #define P2P 1 |
| #define BCAST 2 |
| #define MCAST 3 |
| #define ACAST 4 |
| Interface Used by Application to Stack |
| interface ApplicationInterfaceToStack { |
| //Acknowledgement |
| command result_t EnableAck( ); |
| command result_t DisableAck( ); |
| //Link Estimation Decision |
| command result_t UseLinkEstimate( ); |
| command result_t DiableLinkEstimate( ); |
| //Packet Type |
| command result_t DefinePacketType(int); |
| //Retx |
| command result_t SolicitRetx(int flag); |
| //Application type |
| command result_t DefineApplicationType(int); |
| //Real Time Nature |
| command result_t IsRealTime(int flag); |
| //Load Balance |
| command result_t BalanceLoad( ); |
| } |

Based on bits in the preamble, a corresponding set of API's is exported to the application:

1) EnableAck( ), DisableAck( ): This sets or unsets link layer acknowledgement for packets delivered so that the application layer can be selectively informed of packet delivery status. The application can take appropriate action as needed, such as retransmitting unacknowledged data.
2) UseEstimateLink(int flag): This is used by application that does not tolerate link loss, such as in transmission of a control packet.
3) DefinePacketType(int flag): Used to define the type of packet generated, broadly a "data" packet or a "control" packet. All non-data packets are loosely classified to be of control type by making the field in the preamble a flag type.
4) DefineApplicationType(int): Used to define an application as point-to-point, multicast, broadcast or anycast.
5) IsRealTime(int flag): This is used to describe the nature of the application as real-time (latency sensitive but loss tolerated) or not real-time (latency tolerated, but not loss). Real-time time data is sent with higher priority and at par with control messages in comparison with normal data. Real-time data is also not subject to load balancing unlike control messages.
6) BalanceLoad(int flag): This bit authorizes dynamic load balancing at nodes. When a packet is to be forwarded, a suitable next candidate node is decided. Upon invocation of this function, a trade-off to a shorter path may be made to balance network traffic and curb congestion.

7) SolicitRetx(int flag): Most application types do not require retransmissions and sensitive data is preferably transmitted on a strong channel rather than on a predefined path and accommodate loss by retransmission. Use of this API enables link-layer retransmissions.

The general set of APIs described is a representative implementation. Providing APIs allows application programmers to accurately describe application demands and leave details of implementation to the lower layers with an assurance that resources are used in the most efficient fashion. A few rules that follow as an inherent inference to this classification of application types and demands in general are mentioned below:

1) A SolicitRetx( ) call is undefined when DisableAck( ) is called. Logically, one cannot make a provision for a retransmission if there are no acknowledgements.
2) Control messages, real-time data and anycast messages are by default not provided an acknowledgement. SolicitRetx( ) is also not provided. Control messages are of a higher priority and are preferably transmitted on the strongest link possible to ensure they reach intended destinations(s). For real-time data, loss of a frame/packet or two is usually tolerable, but latency is not. As an example, for a real-time streaming application, a delayed or retransmitted frame is as good as a lost one. Likewise, an anycast packet has no specific destination in mind, and it makes sense to transmit it one time on a strong link.
3) Real-time and broadcast data packets are not given link estimates.

Note that it is possible for an application programmer to write applications that make inefficient use of resources. For example, a real-time application using acknowledgements, no load balancing and allowing retransmission of frames is possible. Design depends upon programmer expertise. When unsure, one can proceed with only the required definitions (such as data type, application type, and IsRealTime(flag)), and let the stack determine the best combination of activities to be performed. In some cases, a stack configuration utility can override application requests or issue notifications that some requests are or appear inconsistent.

Table 1 below is a schematic representation of some of the default definitions of different parameters as understood by the stack design in a representative implementation.

TABLE 1

| DataType | Application | RealTime | Defaults |
|---|---|---|---|
| Control | P2P | 0 | DisableAck( ), EstimateLink(true), BalanceLoad(false) |
| Control | All Others | 0 | DisableAck( ), EstimateLink(true), BalanceLoad(true) |
| Data | P2P | 0 | EnableAck( ), SolicitRetx( ), EstimateLink(true), BalanceLoad(true) |
| Data | P2P | 1 | DisableAck( ), EstimateLink( ), BalanceLoad(false) |
| Data | Multicast | 0 | DisableAck( ), EstimateLink(true), BalanceLoad(true) |
| Data | Broadcast | 0 | DisableAck( ), EstimateLink(false), BalanceLoad(false); |
| Data | Anycast | 0 | DisableAck( ), EstimateLink(true), BalanceLoad(false) |
| Data | Multicast | 1 | DiableAck( ), EstimateLink(flase), BalanceLoad(true) |
| Data | Broadcast | 1 | DiableAck( ), EstimateLink(false), BalanceLoad(false) |
| Data | Anycast | 1 | DisableAck( ), EstimateLink(true), BalanceLoad(true) |

Applications are typically classified on application type (P2P, broadcast, anycast, or multicast), the type of packets they carry (data or control) and whether packets should be delivered in real-time. Such taxonomy is shown in Table 1. The "Defaults" column lists the default action the stack takes when specific parameters are not requested by the application. An explicit API call generally overrides the defaults. The compilation of Table 1 is only one possible "default" setting. Control packets are rated as sensitive to loss and not provided with acknowledgements (a beacon or an ACK packet itself would be a control packet). They are typically sent on the best possible link. Load balancing is disabled for P2P applications, but enabled for others. P2P data packets are provided with reliability (ACK's and balancing as well). Providing reliability is generally preferable to retransmissions, so that applications requesting reliability use strong links, and are distributable for load applications like broadcast or a multicast since traffic is highly directional. The same is not true, however, for real-time P2P data, wherein the large numbers of packets that may be transmitted might prove problematic if reliability is required. For real-time data streams, reliable communication, link estimations, and load balancing can be disabled. Load balancing is disabled because the data is sensitive to latency and out of order packets with varying delay times are practically lost. Broadcast, multicast and anycast data further are not provided reliability. In addition, the link estimate is also enabled for anycast data, never so for broadcast data. In order to explain certain application of the different parameters, two scenarios described below.

Scenario 1: Capturing Temperature of Entities in Zone "X" of a Plant

This is a typical example of an application that captures a monitored entity and reports the same back to a base station or a monitoring terminal. This is a multicast connection (to all sensor nodes in the vicinity of Zone X), real-time in nature (can be continuously monitored for as long as an end user wants), is a "data" oriented application (no control information), can tolerate load balancing for the route back to the end user, does not require link estimate (a best fit would be enough) or an acknowledgement. By default, no link estimate is made, and no acknowledgements or retransmissions take place. This is because real-time data has strict time bounds, and needs to be at a destination in a certain time. Reliability is not as important as delivery time. The application can tolerate a few losses in frames, but can not tolerate variations in routing time. Hence, default settings are based on no ack's, no retransmission, no link estimates, and no load balancing.

An exemplary sample run through the stack is as follows:
Application:
1. Candidate node selection (on a shortest path metric AND load balancing)
2. Send to candidate node 3. Send till sending buffer is full
4. Close Session
5. Energy efficiency determines when the node goes to sleep
6. Medium access
7. Physical layer.

Summarizing, the requirements for this representative application are no link estimate,
no acknowledgements,
no retransmissions,
no congestion estimation, and
no dynamic load balancing, but can be provisioned at route acquisition.

These requirements provide a lightweight transmission scheme. A possible protocol component selection is: Application, UDP, SPEED, S-MAC, GAF and wireless medium. This is because UDP is lightweight and fast, but provides unreliable service. SPEED uses direction over IP for better route acquisition, S-MAC (unlike its counterpart B-MAC) does not provide any link layer acknowledgements or retransmissions.

Scenario 2: Sending Control Information to a Particular Mote

This is another typical application wherein an end user at a monitoring terminal sends a message or critical control information to either a specific mote (point-to-point communication) or to motes in a general area (like motes in the boiler room). The information is critical and needs to be sent reliably. Losses cannot be tolerated, and data should reach a destination rapidly. Thus a protocol components are selected to provide for link estimation (to send on the strongest link), no load balancing, acknowledgements and re-transmissions on failure, and control packet type data (critical). An exemplary run through the stack is as follows Application:
1. Candidate node selection,
2. Estimate link to find candidate node,
3. Use load balance on the candidate nodes to arrive at the required candidate node,
4. Send packet to candidate node,
5. Send link layer acknowledgement to sender node,
6. Wait for receiver to send an acknowledgement,
7. If an ack is received, bring down session, else, retransmit packet until an ack is received from the destination,
8. Energy efficiency determines when this node will go to the sleep mode,
9. Medium access, and
10. Physical wireless link.

Referring to FIG. 3, bit 2 (data type) and bits 4, 5 (application type) can be defined, and other parameters can be determined based on these bits so as to fully define a byte-length (8 bit) preamble. An application programmer would hence specify bit 2 as 0 (data), as well as application type to be 01 (P2P data). This is not real time data, and is elastic (the network makes a best effort to deliver this data accurately, but no guarantee is given on how much time it might take).

These requirements are different than those of Scenario 1. Protocol component choices could include the following: Application, TCP, IP, BMAC, SPAN and wireless physical medium. TCP is connection oriented and highly reliable, IP ensures in-order delivery of the data at destination and has provisions for load balancing, TCP/IP takes care of growing congestion, BMAC is lightweight and provides for an additional link layer reliability in transmission, and SPAN is energy efficient.

For other applications, a different selection of preamble bit values is possible. An application typically has requirements based on critical communication, reliability (combinations of acknowledgements and re-transmissions), link estimates (for a strong outgoing link), and load balancing and congestion estimation.

It should be noted that in one aspect of the present technique, the selection of one or more modules from the at least one layer is dynamically updated based on any change in overall system context. In other words, it is possible for the stack to base decisions on the modules required from the context of physical conditions such as battery charge remaining on a mote or growing congestion on neighboring nodes. Network nodes can be configured to exchange control information such as battery levels at a given node, congestion, and signal strength. Battery strength can be transmitting based on a node advertising beacon that informs other nodes in its neighborhood about its remaining battery life to provide superior routing. The advertising beacon also permits discovery of neighbors for use in routing.

Each node can maintain a common battery threshold. If the battery level of a given node is less than this threshold, the node will normally not accept requests to route data, and may spend a considerable amount of time in "sleep" mode (where battery consumption is at a minimum). Likewise, before sending a packet to another neighbor, the node checks to see a last battery life estimate provided by the neighbor. If less than the threshold, the packet is not normally sent via the neighbor (unless the data is critical and the given neighbor is the only neighbor).

A congestion indication flag is also advertised by nodes along with beacon information. This flag indicates growing congestion at a node which acts as a relay for traffic passing through it. If packets are dropped at that node due to buffer overflow because of growing congestion, this flag is set until the buffer queue length is less than the buffer size (usually, a threshold is again applied here). This is beneficial for routing large data packets and datagrams so that no one node is congested, and traffic is evenly distributed. This also protects nodes against uncontrolled upsurges of packets so that the node does not become a bottleneck. Such nodes can remain accessible when critical information is to be relayed on a shortest path. A node normally sends data to a neighbor with least congestion if load balancing is requested. If information is critical and a given node is the only neighbor available, the request for load-balancing can be disregarded.

Each beacon received at a node provides an indication of source signal strength to the node based on the received beacon signal strength. This allows a node to estimate signal strength if the application requests nodes with highest signal strength such as typically requested for critical data.

In addition, a component selector stack can choose modules depending upon the modules already selected as well. For example, if modules are so selected such that control messages are minimum (because available signal strength is low), this standard can be consistently maintained across module selection at all the layers. This can be done dynamically for every packet. This aspect of the stack makes it attractive for large unattended networks of sensors. The network will adapt to present conditions and will provide a long network lifetime and hence prolonged and accurate monitoring.

The present stack configuration provides individual stack component selection as well as improved component combinations. Such an architecture can provide efficient use of resources. For example, a stateless routing protocol based on minimal neighbor information, link strength estimates, congestion (based on beacons or acknowledgements) link layer acknowledgement, retransmission mechanisms, a medium access mechanism, and an interface to the physical medium can be provided based on selections from a protocol library.

A set of API's influences a routing protocol as well as the link layer. The choice of a next candidate routing node can be based on node suitability. A candidate node would be subject to link estimate and load balancing tests (if enabled). At the end of such testing an appropriate node is selected and the packet forwarded. A node may be added on finding the "candidate node." This may be found using "direction", using addresses or any suitable mechanism. The end result would be a set of nodes which can "potentially" forward the packet to a destination.

Figure 4:
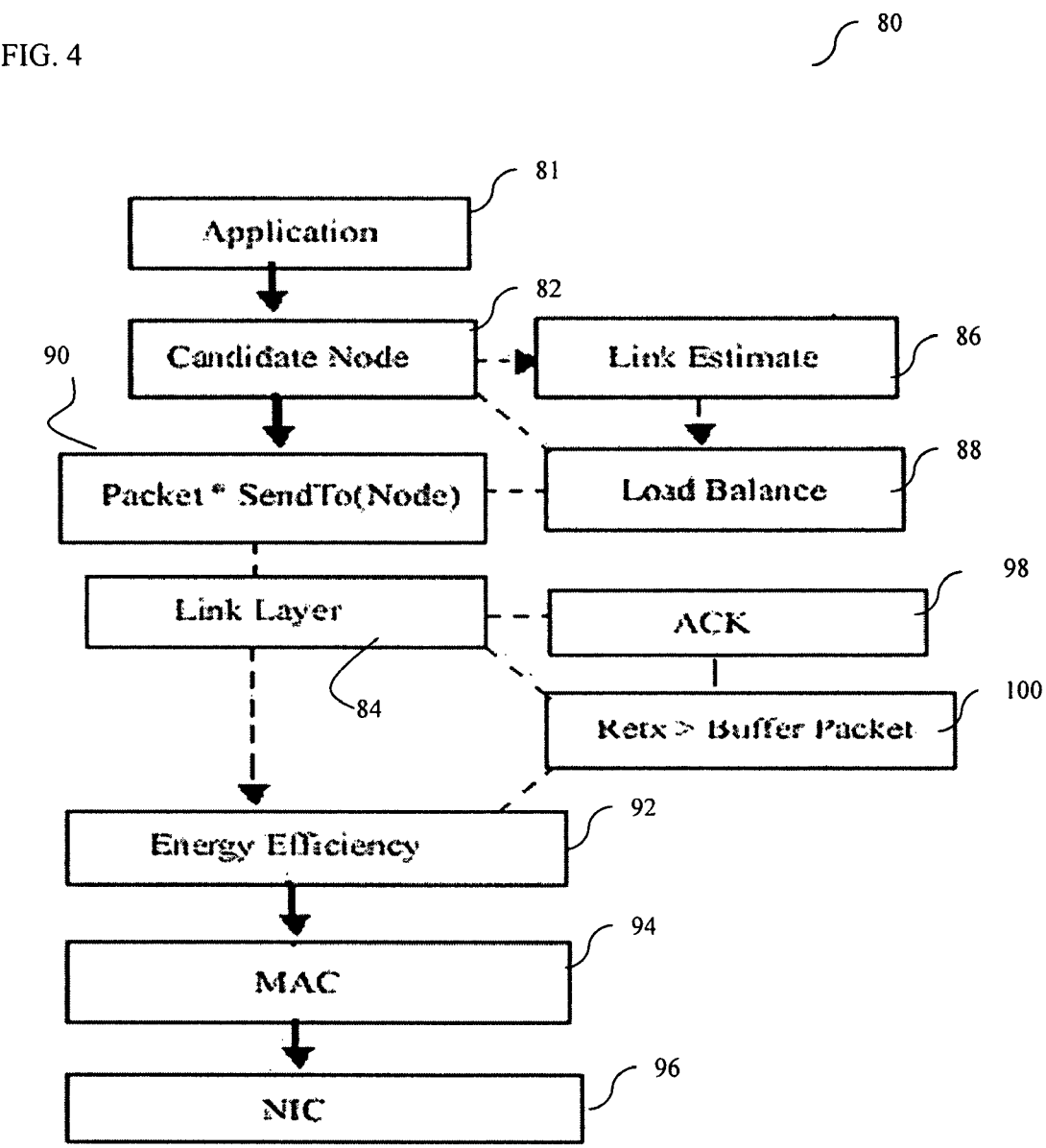
FIG. 4 depicts an exemplary path of a packet from application layer to physical layer in one embodiment of the present technique.

FIG. 4 depicts an exemplary path 80 of a packet from application layer 81 to physical layer in one embodiment of the present technique. Actions upon receiving a packet at a destination or at an intermediate hop would be generally similar with suitable changes to the calling functions. The packet starts at a candidate node 82. The packet stops at the routing and the link-layer 84. At the routing layer, once a pool of candidate nodes 82 is identified, link estimates 86 are performed and then a load balance test 88 is executed based on preamble settings. The set of processes feeds into the Packet* SendTo (node*) function 90 which prepares the packet to be sent the selected node. In addition, modules for energy efficiency 92 and medium access 94 are provided as explained earlier. Protocols may be selected from a protocol library that can be updated to include newly developed protocols.

At Link Layer 84, an additional decision is made. If ACK 98 is requested, the bits are appropriately set. Alternately, if a bidirectional session is already running between two nodes, one can use this packet to piggyback pending ACK's for the destination. If retransmission is solicited, the packet is additionally buffered by the Retransmission (Retx>Buffer Packet) module 100. In addition, various modules are formulated for energy efficiency and media access. Protocols may be used from the choice of available protocols in a library or from later developed protocols that are added to the library.

Figure 5:
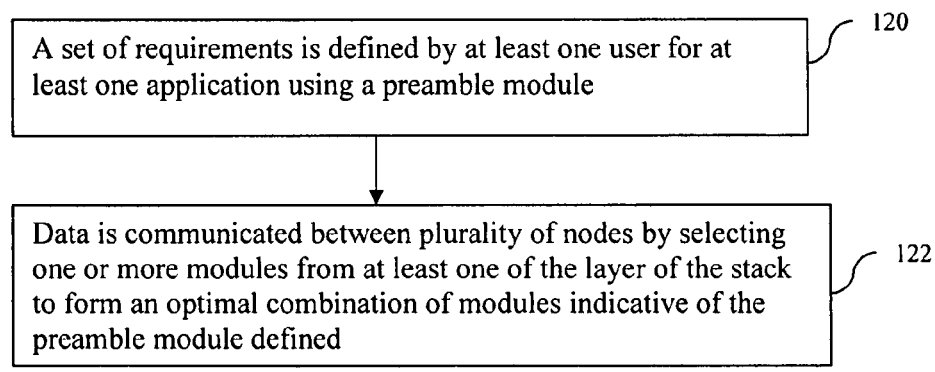
FIG. 5 is a flowchart depicting a representative method in a wireless sensor network adapted to provide a communication link between a plurality of nodes.

FIG. 5 is a flowchart depicting a method in a wireless sensor network adapted to provide a communication link between a plurality of nodes comprising a protocol stack encapsulating a plurality of fundamental network protocol layers that correspond to an open system interconnection (OSI) model, wherein each of the layers comprises a plurality of modules. The method starts in a step 120, wherein a set of requirements is defined by at least one user for at least one application using a preamble module. At step 122, data is communicated between the plurality of nodes by selecting one or more modules from at least one of the layers of the stack to form a combination of modules indicative of the preamble module defined, wherein the combination is based on quality of service (QoS) desired by the at least one application. It should be noted that the selection of the one or more modules from the at least one layer can be based on the selected modules in preceding layers and available modules in succeeding layers.

As will be appreciated by a person skilled in the art, the selection of one or more modules from the at least one layer is dynamically updated based on any change in overall system context such as node congestion or battery life of a node. Further, as described earlier, the preamble module is defined based on a type of the at least one application. The method further includes a categorization module adapted to categorize the at least one application into one or more categories for defining the preamble module. In certain implementations of the present technique, the method includes mapping the set of requirements for the at least one application to available modules in at least one of the layers of the protocol stack on a per packet basis based on the processing of the preamble module. The selection of one or more modules from each of the layers can be updated based on any change in the requirements of the at least one application.

Figure 6:
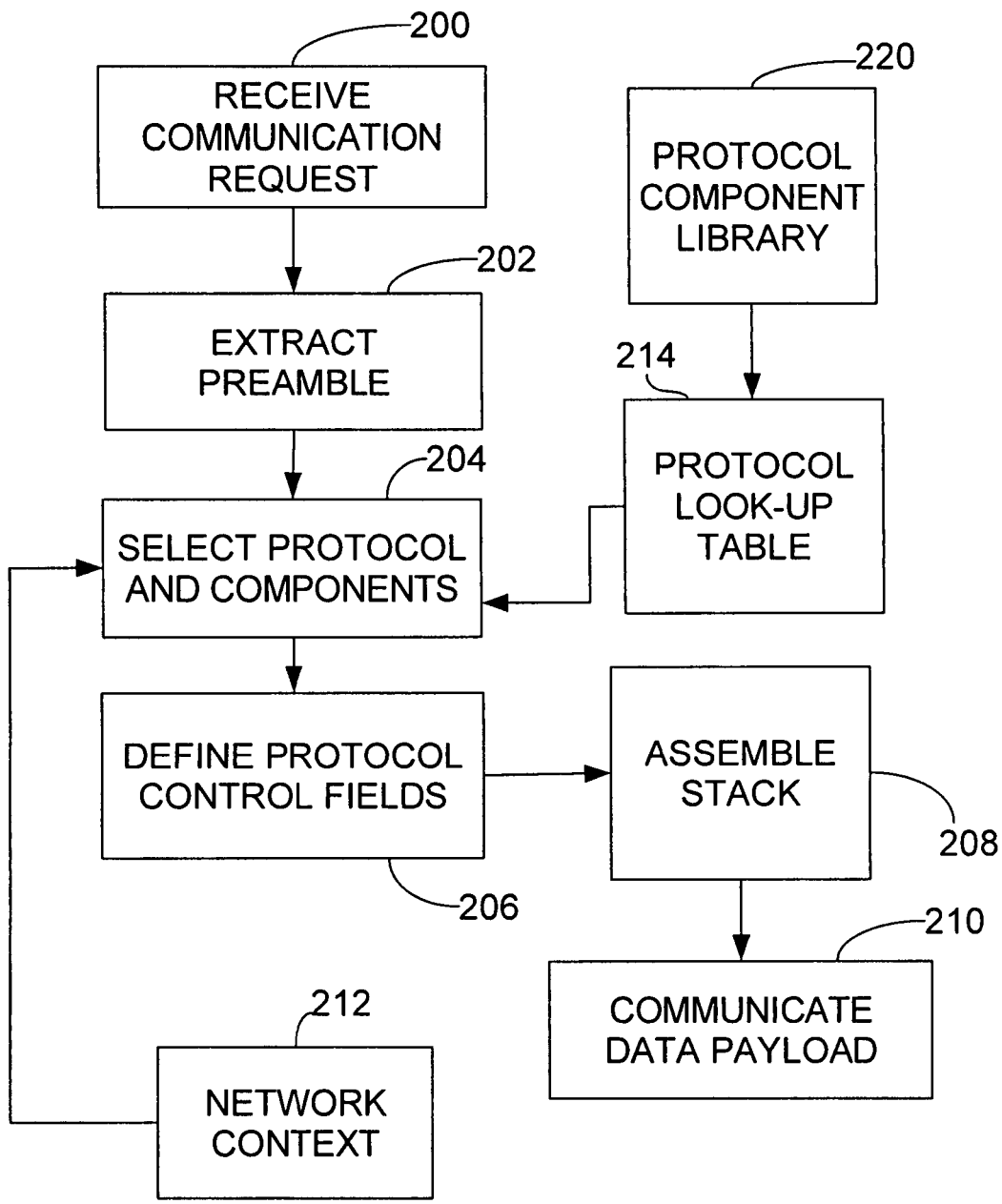
FIG. 6 is a block diagram illustrating a representative method of configuring a stack in response to a communication request from an application.

Referring to FIG. 6, a method of providing an application-adapted stack and communicating with such a stack is illustrated. A communication request 200 is received from an application, and a preamble indicative of a requested communication configuration is extracted in 202. Based on the preamble, stack components are selected in 204 using a protocol look-up table that associates various stack components with the preamble. Protocol components are obtained from a protocol library 220. Network context data (power, battery life, congestion data) stored in a database 212 that is typically updated during network operation can be evaluated as well to guide selection of protocol components. If needed, protocol component customization fields can be completed in 206, and a complete stack assembled in 208. A data payload is communicated based on the completed stack in 210. Additional communication requests (even apparently identical requests) can be similarly processed to assemble a new stack. Because the network context database 212 and the protocol library 220 are dynamic, the new stack may include one or more different protocol components.

The foregoing examples, demonstrations, and method steps may be implemented by suitable code on a processor based system, such as a general purpose or special purpose computer. It should also be noted that different implementations of the present technique may perform some or all the steps described herein in different orders or substantially concurrently, that is, in parallel. Furthermore, the functions may be implemented in a variety of programming languages. Such code, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory. Typically, computer-executable instructions are stored.

Representative examples of networks that include the disclosed technology include environmental sensor networks that include one or more nodes that sense temperature, pressure, humidity, sound levels, light levels, pressure, wind speed, or other parameters. Other example networks include security networks having nodes that detect and report (via the network) motion, intrusions, attempted intrusions, status of locks and other security devices, and other parameters.

The sequence of instructions as explained in the representative method steps may include but is not limited to, program code adapted to define a set of requirements for at least one application using a preamble module. The sequence of instructions further includes program code adapted to communicate data between the plurality of nodes by selecting one or more modules from at least one of the layer of the stack to form a selected combination of modules indicative of the preamble module defined, wherein the combination is based on quality of service (QoS) desired by the at least one application using a communication module. It should also be noted that the selection of the one or more modules from the at least one layer can be based on the selected modules in preceding layers and available modules in succeeding layers. Further, the sequence of instruction includes a categorization module comprising program code adapted to categorize the at least one application into one or more categories for defining the preamble module and a program code adapted for mapping the set of requirements for the at least one application to available modules in at least one of the layers of the protocol stack on a per packet basis based on the processing of the preamble module of the protocol stack.

We claim:

1. A wireless sensor network node, comprising:
a preamble module adapted for defining a set of requirements for communication of a data packet by an application, the preamble module configured to define the set of requirements by establishing a preamble comprising an indication of an application type, an indication of a data packet type, a real time flag, an acknowledgement flag, a link estimate flag, a retransmission flag and a load balance flag, the premable module further configured to set or reset at least one of the acknowledgement flag, the link estimate flag, the retransmission flag and the load balance flag based on one or more of the application type, the data packet type and the real time flag;
a protocol lookup module configured to identify at least one protocol component based at least in part on the application type and the data packet type; and
a processor configured to process the data packet based on the at least one protocol component and deliver the processed data packet to a scheduler.

2. The network node of claim 1, wherein the preamble is communicated with the data packet.

3. The network node of claim 2, wherein the preamble is defined as a data byte that includes bits associated with data type, data transfer reliability, and data transfer delay, respectively.

4. A method, comprising:
establishing at least one preamble bit comprising an indication of an application type of a network application transmitting a data payload, a data packet type of a data packet comprising the data payload, a real time flag, an acknowledgement flag, a link estimate flag, a retransmission flag and a load balance flag;
setting or resetting at least one of the acknowledgement flag, the link estimate flag, the retransmission flag and the load balance flag based on one or more of the application type, the data packet type and the real time flag;
establishing a protocol stack that includes a plurality of protocol components based at least in part on the application type and the data packet type;
attaching the at least one preamble bit to the data payload; and
transmitting the at least one preamble bit and the data payload.

5. The method of claim 4, further comprising selecting at least one protocol component based on the at least one preamble bit.

6. The method of claim 5, further comprising transmitting the data payload and the at least one preamble bit to a network node based on the selected at least one protocol component.

7. The method of claim 6, wherein the at least one preamble bit is part of a preamble byte that includes preamble bits associated with data type, data reliability, and data delivery delay, and the preamble byte is attached to the data payload.

8. The method of claim 7, further comprising selecting a plurality of protocol components based on the preamble byte.

9. The method of claim 5, wherein the at least one preamble bit and the data payload are transmitted by the network application.

10. The method of claim 5, wherein the at least one selected protocol component is selected based on a preferred energy use at least one network node.

11. The method of claim 5, wherein the at least one selected protocol component is selected based on congestion at least one network node.

12. The method of claim 4, further comprising:
associating the established protocol stack with a subsequent data payload that is substantially similar to the transmitted data payload;
attaching the at least one preamble bit to the subsequent data payload; and
selecting at least one subsequent protocol component that is different than the plurality of protocol components associated with transmission of the transmitted data payload.

13. The method of claim 12, further comprising transmitting the subsequent data payload based on the at least one subsequent protocol component.

14. The method of claim 4, wherein the data payload is associated with an environmental sensor or a security sensor.

15. The method of claim 4, wherein the data packet type indicates a control packet, the application type indicates a point-to-point addressing and networking methodology and the real time flag is set to false; and
the setting or resetting comprises setting the acknowledgement flag to false, the link estimate flag to true; and the load balance flag to false.

16. The method of claim 4, wherein the data packet type indicates a data packet, the application type indicates a point-to-point addressing and networking methodology, the real time flag is set to false; and
the setting or resetting comprises setting the acknowledgement flag to true, the retransmission flag to true, the link estimate flag to true and the load balance flag is set to true;
wherein the plurality of protocol components comprises a UDP module.

17. The method of claim 4, wherein the data packet type indicates a data packet, the application type indicates a broadcast addressing and networking methodology and the real time flag is set to false; and
the setting or resetting comprises setting the acknowledgement flag to false, the link estimate flag to false and the load balance flag is set to false;
wherein the plurality of protocol components comprises a UDP component and an S-MAC component.

18. The method of claim 4, wherein the data packet type indicates a data packet, the application type indicates a multicast addressing and networking methodology and the real time flag is set to true; and
the setting or resetting comprises setting the acknowledgement flag to false, the link estimate flag to false; and the load balance flag to false;
wherein the plurality of protocol components comprises a UDP component and an S-MAC component.

19. The method of claim 4, wherein the data packet type indicates a data packet, the application type indicates a multicast addressing and networking methodology, the real time flag is set to true and the acknowledgement flag is set to false; and
the setting or resetting comprises setting the retransmission flag to false, the link estimate flag to false and the load balance flag to false;

wherein the plurality of protocol components comprises UDP, SPEED, S-MAC and GAF components.

20. A non-transitory computer-readable medium containing computer-executable instructions for performing a method comprising:

establishing at least one preamble bit comprising an indication of an application type of a network application transmitting a data payload, a data packet type of a data packet comprising the data payload, a real time flag, an acknowledgement flag, a link estimate flag, a retransmission flag and a load balance flag;

setting or resetting at least one of the acknowledgement flag, the link estimate flag, the retransmission flag and the load balance flag based on one or more of the application type, the data packet type and the real time flag;

establishing a protocol stack that includes a plurality of protocol components based at least in part on the application type and the data packet type;

attaching the at least one preamble bit to the data payload; and transmitting the at least one preamble bit and the data payload.

\* \* \* \* \*

UNITED STATES PATENT AND TRADEMARK OFFICE
CERTIFICATE OF CORRECTION

PATENT NO. : 8,189,474 B2
APPLICATION NO. : 11/906141
DATED : May 29, 2012
INVENTOR(S) : Venkataraman et al.

It is certified that error appears in the above-identified patent and that said Letters Patent is hereby corrected as shown below:

In the Specification

Col. 3, line 42, "energy use at least one network node or based" should read --energy use at at least one network node or based--;

In the Claims

Claim 11, Col. 20, line 8, "congestion at least" should read --congestion at at least--.

Signed and Sealed this
Eighth Day of January, 2013

David J. Kappos
*Director of the United States Patent and Trademark Office*